United States Patent
Demirors et al.

(10) Patent No.: US 12,104,301 B2
(45) Date of Patent: *Oct. 1, 2024

(54) NON-WOVEN FABRIC HAVING ETHYLENE/ALPHA-OLEFIN POLYMER FIBERS

(71) Applicant: DOW GLOBAL TECHNOLOGIES LLC, Midland, MI (US)

(72) Inventors: Mehmet Demirors, Pearland, TX (US); Fabricio Arteaga Larios, Sugarland, TX (US); Mridula Kapur, Lake Jackson, TX (US); Philip P. Fontaine, Pearland, TX (US); David T. Gillespie, Pearland, TX (US); Yijian Lin, Pearland, TX (US); Lanhe Zhang, Pearland, TX (US); Sanjib Biswas, Manvel, TX (US); Eduardo Alvarez, Tarragona (ES); Aleksandar Stoiljkovic, Waedenswil (CH); Rajen M. Patel, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 805 days.

This patent is subject to a terminal disclaimer.

(21) Appl. No.: 17/293,188

(22) PCT Filed: Nov. 20, 2019

(86) PCT No.: PCT/US2019/062336
§ 371 (c)(1),
(2) Date: May 12, 2021

(87) PCT Pub. No.: WO2020/106797
PCT Pub. Date: May 28, 2020

(65) Prior Publication Data
US 2022/0002924 A1  Jan. 6, 2022

(30) Foreign Application Priority Data
Nov. 20, 2018 (EP) .................................... 18382830

(51) Int. Cl.
*D04H 3/007* (2012.01)
*C08F 210/16* (2006.01)
(Continued)

(52) U.S. Cl.
CPC ................ *D04H 3/007* (2013.01); *D01F 6/46* (2013.01); *D01F 8/06* (2013.01); *D04H 1/4291* (2013.01);
(Continued)

(58) Field of Classification Search
CPC .......... D01F 6/46; D01F 8/06; D04H 1/4291; D10B 2321/021; C08F 210/16;
(Continued)

(56) References Cited

U.S. PATENT DOCUMENTS 5,322,728 A  6/1994  Davey et al.
8,907,030 B2  12/2014  Demirors et al.
(Continued)

FOREIGN PATENT DOCUMENTS

EP  1745171 B1  1/2012
EP  2521807 B1  2/2014
(Continued)

OTHER PUBLICATIONS

International Search Report for the corresponding International Application No. PCT/US2019/062336, International Filing Date: Nov. 20, 2019, Date of Mailing: Jan. 24, 2020; 43 pages.
(Continued)

*Primary Examiner* — Jennifer A Gillett
(74) *Attorney, Agent, or Firm* — CANTOR COLBURN LLP

(57) ABSTRACT

A nonwoven fabric comprises at least one fiber having a first component prepared from at least 75 wt. % of bimodalethylene/alpha-olefin interpolymer composition, wherein the ethylene/alpha-olefin interpolymer composition is characterized by: a density in the range of 0.930 to 0.965 g/cm³, a melt index (I2) in the range of from 10 to 60 g/10 minutes,
(Continued)

wherein the I2 is measured according to ASTM D1238, 190 C, 2.16 kg, a molecular weight distribution, expressed as the ratio of the weight average molecular weight to number average molecular weight ($M_{w(GPC)}/M_{n(GPC)}$) as determined by GPC of from 1.5 to 2.6, a tan delta at 1 radian/second of at least 45, a low temperature peak and a high temperature peak on an elution profile via improved comonomer composition distribution (ICCD) procedure, and a full width at half maximum of the high temperature peak is less than 6.0° C.

16 Claims, 1 Drawing Sheet

(51) Int. Cl.
| | | |
|---|---|---|
| | *D01F 6/46* | (2006.01) |
| | *D01F 8/06* | (2006.01) |
| | *D04H 1/4291* | (2012.01) |

(52) U.S. Cl.
CPC ........ *C08F 210/16* (2013.01); *C08F 2500/03* (2013.01); *C08F 2500/06* (2013.01); *C08F 2500/12* (2013.01); *D10B 2321/021* (2013.01); *D10B 2321/022* (2013.01)

(58) Field of Classification Search
CPC .... C08F 2/001; C08F 210/14; C08F 2500/12; C08F 2500/03; C08F 2500/02; C08F 2500/06; C08F 2500/29; C08F 4/64193
See application file for complete search history.

(56) References Cited

U.S. PATENT DOCUMENTS

| | | | |
|---|---|---|---|
| 9,688,795 B2 | 6/2017 | Cerk et al. | |
| 2010/0304052 A1 | 12/2010 | Chai et al. | |
| 2011/0172354 A1* | 7/2011 | Claasen | C08L 23/04 |
| | | | 525/240 |
| 2011/0263801 A1* | 10/2011 | Garoff | C08F 210/16 |
| | | | 526/116 |
| 2013/0190465 A1* | 7/2013 | Demirors | C08F 10/00 |
| | | | 526/348.2 |
| 2014/0248811 A1 | 9/2014 | Degroot et al. | |
| 2014/0248816 A1 | 9/2014 | Bonavoglia et al. | |
| 2014/0323003 A1 | 10/2014 | Richeson et al. | |
| 2018/0273708 A1* | 9/2018 | Kikuchi | A61L 27/16 |

FOREIGN PATENT DOCUMENTS

| | | |
|---|---|---|
| EP | 2547811 B1 | 4/2014 |
| EP | 2227505 B1 | 12/2014 |
| JP | 2001115367 A | 4/2001 |
| WO | 2011002868 A2 | 1/2011 |
| WO | 2017040127 A1 | 3/2017 |

OTHER PUBLICATIONS

Written Opinion for the corresponding International Application No. PCT/US2019/062336, International Filing Date: Nov. 20, 2019, Date of Mailing: Jan. 24, 2020; 12 pages.

* cited by examiner

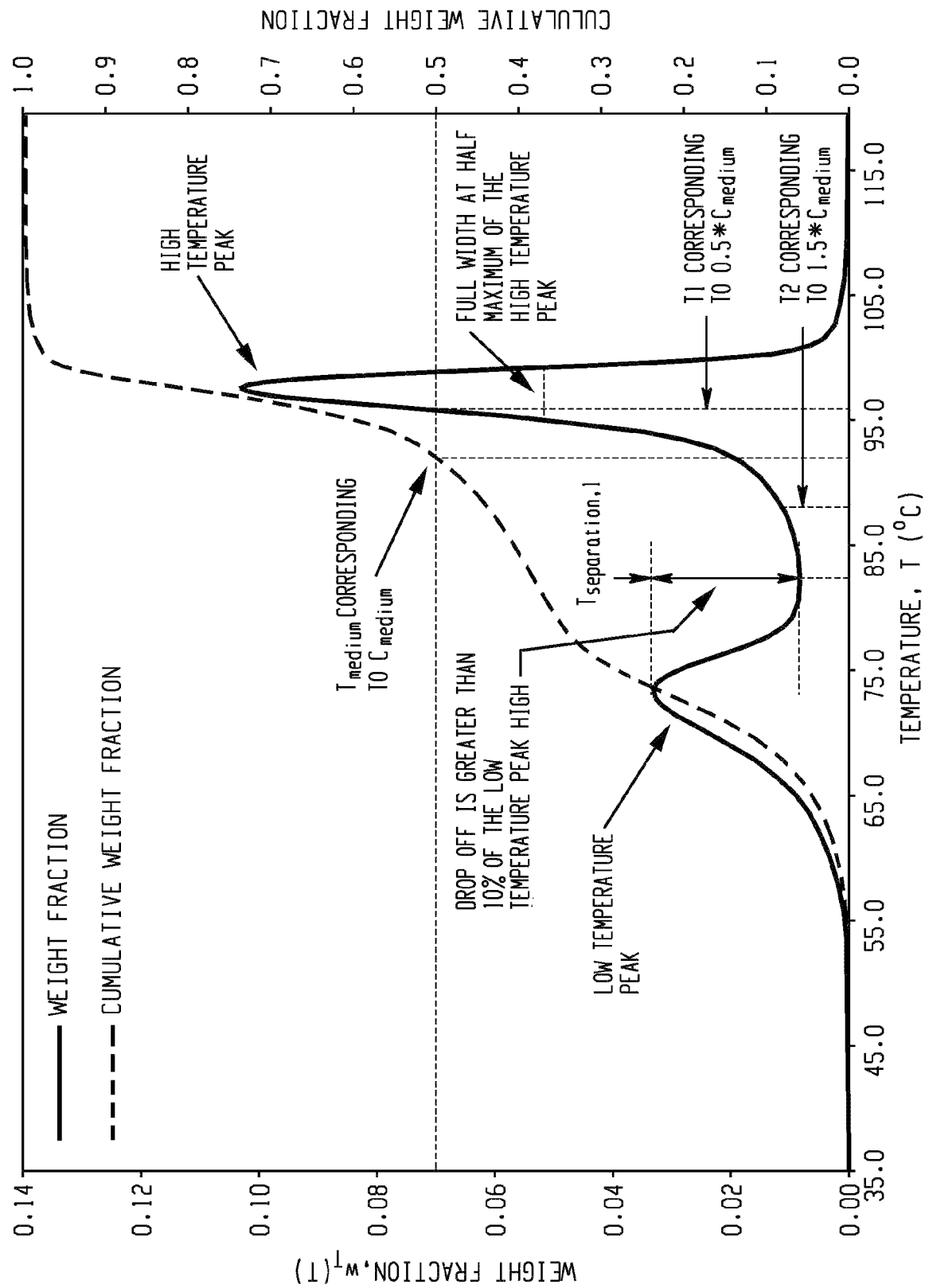

NON-WOVEN FABRIC HAVING ETHYLENE/ALPHA-OLEFIN POLYMER FIBERS

CROSS-REFERENCE TO RELATED APPLICATIONS

This application is a National Stage application of PCT/US2019/062336, filed Nov. 20, 2019, which claims benefit of European Application No. 18382830.0 filed on Nov. 20, 2018, both of which are incorporated by reference herein in their entirety.

FIELD OF THE INVENTION

The field of the invention is non-woven fabrics of ethylene/alpha-olefin polymers.

BACKGROUND

Non-woven fabrics have numerous applications, such as filters, disposable materials in medical applications, and baby diapers. Polyolefin fibers can be used in making such non-wovens. See e.g. US 2014/0248811.

SUMMARY OF THE INVENTION

Disclosed herein is a non-woven fabric comprising at least one fiber having a first component prepared from at least 75 wt. % of an ethylene/alpha-olefin interpolymer composition, wherein the ethylene/alpha-olefin interpolymer composition has: a density in the range of 0.930 to 0.965 g/cm$^3$, a melt index (I2) in the range of from 10 to 60 g/10 minutes, wherein the I2 is measured according to ASTM D1238, 190° C., 2.16 kg, a molecular weight distribution, expressed as the ratio of the weight average molecular weight to number average molecular weight ($M_{w(GPC)}/M_{n(GPC)}$) in the range of from 1.5 to 2.6, a tan delta at 1 radian/second of at least 45, a low temperature peak and a high temperature peak on an elution profile via improved comonomer composition distribution (ICCD) procedure, and a full width at half maximum of the high temperature peak of less than 6.0° C.

The fiber can be a monocomponent fiber, or can have two or more regions or components of different compositions (e.g. a bicomponent fiber).

The non-woven can be formed by a spun-bond process as the composition and fibers taught herein are particularly suitable for spun-bonding and can be spun at high cabin pressures compared to other polyolefin compositions. The bimodal characteristics of the ethylene/alpha-olefin interpolymer can lead to better bonding strength and high abrasion resistance in the non-woven.

BRIEF DESCRIPTION OF THE DRAWINGS

FIG. 1 is an ICCD Elution profile of the polymer composition as in Ex. 3.

DETAILED DESCRIPTION OF THE INVENTION

Disclosed herein is a non-woven fabric as discussed above.
Ethylene/Alpha-Olefin Interpolymer A key feature of the non-woven fabric is that the fibers are made with a specific ethylene/alpha-olefin interpolymer composition. By interpolymer is meant that the polymer is a polymer of two, three, or more monomers—i.e. a copolymer, terpolymer, etc. In this case the first monomer is ethylene. The second monomer is an alpha olefin. Such alpha olefins have at least 3 carbon atoms, and, for example, may have up to 20, or up to 10 or up to 8 carbons atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. Optional third, fourth, or more monomers may be alpha-olefins. The interpolymer compositions are bimodal and can be conveniently made by combining two ethylene/alpha olefin interpolymers having different molecular weights and/or different densities and/or at least two different peaks in ICCD elution as described in more detail below.

The interpolymers can be random interpolymers. The interpolymer can comprise at least 50 mole percent or at least 60 mole percent or at least 70 mole percent of ethylene based repeat units based on total moles of repeat units in the interpolymer. The interpolymer can comprise no more than 99.9 or no more than 99.5 or no more than 99, or no more than 95, or no more than 90 or no more than 85 mole percent ethylene based repeat units based on total moles of repeat units in the interpolymer. The interpolymer can comprise at least 0.1 or at least 0.5 or at least 1 or at least 5 or at least 10 mole percent of alpha olefin based repeat units based on total moles of repeat units in the interpolymer (i.e. the second and optional third and fourth monomers). The interpolymer can comprise no more than 50 or no more than 30 mole percent of alpha olefin based repeat units based on total moles of repeat units in the interpolymer (i.e. the second and optional third and fourth monomers).

These ethylene/alpha-olefin interpolymer compositions can be characterized by a density of at least 0.930 g/cm$^3$ and no more than 0.965 g/cm3. For example, particularly when a monocomponent fiber is formed, the density can be no more than 0.940 g/cm$^3$. For example, particularly when a bicomponent fiber is formed, the density can be no more than 0.960 g/cm$^3$ and can be at least 0.940 g/cm$^3$. Density is measured according to ASTM D792. Bicomponent fibers comprising the disclosed ethylene/alpha olefin interpolymer, can show good abrasion resistance and tensile strength, especially at the higher densities. The bimodal polymer compositions can be characterized by a lower density fraction having a density in the range of about 0.900 to about 0.940 g/cm$^3$ and a higher density fraction having a density of at least about 0.950 g/cm$^3$.

These ethylene/alpha-olefin interpolymer compositions can be characterized by a melt index (I2) in the range of from 10 to 60 g/10 minutes, wherein the I2 is measured according to ASTM D1238, 190° C., 2.16 kg. In addition the ratio of the I10/I2 can be less than 6.9 or less than 6.8 or less than 6.7, wherein I10 is measure according to ASTM D1238, 190° C., 10 kg. Lower I10/I2 ratio can indicate lower levels of long chain branching that leads to better spinnability/processability.

These ethylene/alpha-olefin interpolymer compositions can be characterized by a molecular weight distribution by the method set forth below, expressed as the ratio of the weight average molecular weight to number average molecular weight ($M_{w(GPC)}/M_{n(GPC)}$) in the range of no more than 2.6 or no more than 2.5 and at least 1.5 or at least 1.7 or at least 2.0. Interpolymer compositions having a molecular weight distribution in this range are believed to have better processability (e.g. fiber spinning) than interpolymers having a broader molecular weight distribution.

The ethylene/alpha olefin interpolymer is characterized by a $M_{w(GPC)}/M_{n(GPC)}$ greater than (I10/I2)–4.63.

The ethylene/alpha-olefin interpolymer compositions can have a weight average molecular weight from a lower limit of 15,000 g/mol, 20,000 g/mol, or 30,000 g/mol to an upper limit of 100,000 g/mol, 120,000 g/mol, or 150,000 g/mol. The $M_{z(GPC)}/M_{w(GPC)}$ can be less than 3.0 or less than 2.0 and can be more than 1.0. The bimodal polymer composition can show two different peaks in ICCD elution. The higher temperature fraction has a peak position molecular weight of no more than 70,000 g/mol, or no more than 50,000 g/mol. The higher temperature fraction can have a peak position molecular weight of at least 15,000 or at least 20,000 g/mol. The lower temperature fraction can have a peak position molecular weight of at least 30000 or at least 40,000 or at least 50,000 g/mol. The lower temperature fraction can have a peak position molecular weight of no more than 250,000 or no more than 200,000 or no more than 150,000 g/mol.

These ethylene/alpha-olefin interpolymer compositions can be characterized by a tan delta (tan δ) at 1 radian/second of at least 45 or at least 50. In addition, these ethylene/alpha-olefin interpolymers can be characterized by a ratio of tan delta at 1 radian/second at 190° C. to tan delta at 100 radians/second at 190° C. of at least 12. These characteristics can be measured by dynamic mechanical spectroscopy (DMS).

These ethylene/alpha-olefin interpolymer compositions can be characterized by at least two distinguishable peaks between 35° C. to 110° C. on the elution profile of improved comonomer composition distribution (ICCD) with a distinct valley (drop of at least 10% compared to the peak height of the smaller peak) between the peaks, wherein the peak positions must be separated by a minimum of 10° C. Each peak is separated by a vertical line at the lowest height point of the adjoining valley.

The peak temperature of the lower temperature peak can be at least 50° C. or at least 60° C. and can be less than 90° C. or is less than 75° C. The peak temperature of the higher temperature peak can be at least 90° C. or at least 95° C. and can be less than 110° C. or 105° C. or 100° C. Lower temperature peaks in the range of 50 to 75° C. can be particularly useful in monocomponent fiber. Peak temperature of the low temperature peak of 75 to 90° C. can be particularly useful in bicomponent fibers.

The weight fraction of the low temperature peak fraction can be at least 25 or at least 30 and less than 65 or less than 60 or less than 55 weight percent based on total weight of the eluted polymer. The weight fraction of the high temperature peak fraction can be at least 35 or at least 40 or at least 45 and no more than 75 weight percent based on total weight of the eluted polymer.

The full width at half maximum of the high temperature peak can be less than 6.0° C. A narrow peak for the high density fraction denotes a narrow composition distribution without a large molecular weight polydispersity that contains ultra-high or ultra-low molecular weight species that could impede spinning performance or create extractables.

The ethylene/alpha olefin composition can have a composition distribution breadth index (CDBI) of less than 0.5 (i.e. less than 50%), less than 0.3 (30%), less than 0.25 (25%), less than 0.22 (22%) or less than 0.2 (20%).

The ethylene/alpha-olefin interpolymer composition can have a comonomer distribution constant (CDC) of less than 100, preferably 30-80.

The ethylene/alpha-olefin interpolymer compositions can be characterized by molecular weighted comonomer distribution index (MWCDI) of greater than 0.20, or greater than 0.25 or greater than 0.30 or greater than 0.35, or greater than 0.40 or greater than 0.45 or greater than 0.50. MWCDI is a measure of the slope of comonomer incorporation as a function of molecular weight obtained from conventional gel permeation chromatography. If MWCDI is greater than 0.25 (between a molecular weight range of 20,000 and 200,000 g/mol), the resin structure is viewed as having a significant reverse comonomer incorporation with more comonomer on the higher molecular weight side of the distribution.

The ethylene/alpha olefin interpolymer compositions disclosed herein can be characterized by low amounts of long chain branching (LCB). This can be indicated by low zero shear viscosity ratios (ZSVR). Specifically, the ZSVR can be less than 1.35 or no more than 1.30. The ZSVR can be at least 1.10.

The ethylene/alpha olefin interpolymer compositions can be characterized by a vinyl saturation number per 1,000,000 carbon atoms of less than 230, or less than 210, or less than 190, or less than 170, or less than 150 as determined by $^1$H-NMR.

Any conventional polymerization processes can be employed to produce the ethylene/α-olefin interpolymer composition. Such conventional polymerization processes include, but are not limited to, solution polymerization process, using one or more conventional reactors e.g. loop reactors, isothermal reactors, stirred tank reactors, batch reactors in parallel, series, and/or any combinations thereof. Such conventional polymerization processes also include gas-phase, solution or slurry polymerization or any combination thereof, using any type of reactor or reactor configuration known in the art.

In general, the solution phase polymerization process occurs in one or more well-mixed reactors such as one or more isothermal loop reactors or one or more adiabatic reactors at a temperature in the range of from 115 to 250° C.; for example, from 115 to 200° C., and at pressures in the range of from 300 to 1000 psi; for example, from 400 to 750 psi. For example, in a dual reactor, the temperature in the first reactor can be in the range of from 115 to 190° C., or from 115 to 150° C., and the second reactor temperature can be in the range of 150 to 200° C., or from 170 to 195° C. For example, in a single reactor, the temperature in the reactor can be in the range of from 115 to 190° C., or from 115 to 150° C. The residence time in solution phase polymerization process is typically in the range of from 2 to 30 minutes; for example, from 10 to 20 minutes. Ethylene, solvent, hydrogen, one or more catalyst systems, optionally one or more co-catalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Tex. The resultant mixture of the ethylene/alpha-olefin interpolymer and solvent is then removed from the reactor and the ethylene/alpha-olefin interpolymer is isolated. Solvent is typically recovered via a solvent recovery unit, i.e. heat exchangers and vapor liquid separator drum, and is then recycled back into the polymerization system.

The ethylene/α-olefin interpolymer composition can be produced via solution polymerization in a dual reactor system, for example a dual loop reactor system, wherein ethylene and optionally one or more α-olefins are polymerized in the presence of one or more catalyst systems. Additionally, one or more co-catalysts may be present.

The ethylene/alpha-olefin interpolymers can be produced via solution polymerization in a single reactor system, for example a single loop reactor system, wherein ethylene and optionally one or more α-olefins are polymerized in the presence of one or more catalyst systems. Two different catalysts can be used in a dual reactor system. One or both of the two different catalysts have the formula (I) as shown below. This allows for manufacture of the bimodal interpolymer compositions as described above.

An exemplary catalyst system suitable for producing the first ethylene/alpha olefin interpolymer can be a catalyst system comprising a procatalyst component comprising a metal-ligand complex of formula (I):

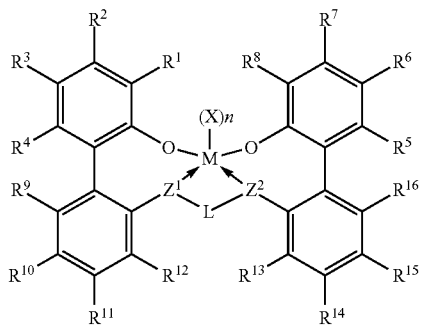

(I)

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—, wherein independently each $R^N$ and $R^P$ is (C1-C30)hydrocarbyl or (C1-C30)heterohydrocarbyl; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in Formula (I) (to which L is bonded) or the ($C_1$-$C_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$)hydrocarbyl or ($C_1$-$C_{30}$)heterohydrocarbyl; $R^1$ and $R^8$ are independently selected from the group consisting of —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and radicals having formula (II), formula (III), or formula (IV):

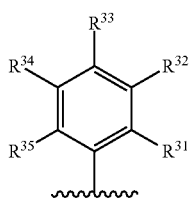

(II)

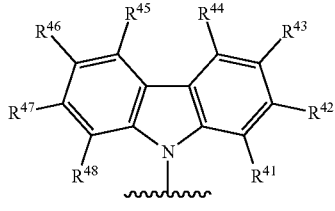

(III)

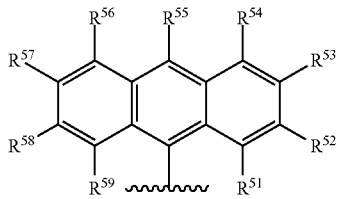

(IV)

In formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, or —H, provided at least one of $R^1$ or $R^8$ is a radical having formula (II), formula (III), or formula (IV) where $R^C$, $R^N$, and $R^P$ are as defined above.

In formula (I), each of $R^{2-4}$, $R^{5-7}$, and $R^{9-16}$ is independently selected from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and —H where $R^C$, $R^N$, and $R^P$ are as defined above.

The catalyst system comprising a metal-ligand complex of formula (I) may be rendered catalytically active by any technique known in the art for activating metal-based catalysts of olefin polymerization reactions. For example, a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 ($C_1$-$C_{20}$)hydrocarbyl substituents as described herein. Examples of Group 13 metal compounds are tri(($C_1$-$C_{20}$)hydrocarbyl)-substituted-aluminum or tri(($C_1$-$C_{20}$)hydrocarbyl)-boron compounds; tri(hydrocarbyl)-substituted-aluminum, tri(($C_1$-$C_{20}$)hydrocarbyl)-boron compounds; tri(($C_1$-$C_{10}$)alkyl)aluminum, tri(($C_6$-$C_{18}$)aryl)boron compounds; and halogenated (including perhalogenated) derivatives thereof. In further examples, Group 13 metal compounds are tris(fluoro-substituted phenyl)boranes, tris(pentafluorophenyl)borane. An activating co-catalyst can be a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl) methylammonium tetrakis(pentafluorophenyl)borane). As used herein, the term "ammonium" means a nitrogen cation that is a (($C_1$-$C_{20}$)hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$) hydrocarbyl, when two or more are present, may be the same or different.

Combinations of neutral Lewis acid activators (co-catalysts) include mixtures comprising a combination of a tri(($c_1$-$c_4$)alkyl)aluminum and a halogenated tri(($c_6$-$c_{18}$)aryl) boron compound, especially a tris(pentafluorophenyl)borane; or combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane):(alumoxane) [e.g., (Group 4 metal-ligand complex):(tris(pentafluoro-phenylborane):(alumoxane)] are from 1:1:1 to 1:10:30, or from 1:1:1.5 to 1:5:10.

The catalyst system comprising the metal-ligand complex of formula (I) can be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate(1$^-$) amine, and combinations thereof.

One or more of the foregoing activating co-catalysts can be used in combination with each other. One preferred combination is a mixture of a tri(($c_1$-$c_4$)hydrocarbyl)aluminum, tri(($c_1$-$c_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. The ratio can be at least 1:5000, or, at least 1:1000; and can be no more than 10:1 or no more than 1:1. When an alumoxane alone is used as the activating co-catalyst, preferably the number of moles of the alumoxane that are employed can be at least 100 times the number of moles of the metal-ligand complex of formula (I). When tris(pentafluorophenyl)borane alone is used as the activating co-catalyst, the ratio of the number of moles of the tris (pentafluorophenyl)borane that are employed to the total number of moles of one or more metal-ligand complexes of formula (I) can be from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

The Fibers and Non-Woven.

The ethylene/alpha-olefin interpolymer as described above either alone or in combination with other materials forms a first component of the fiber.

At least 75%, or at least 80%, or at least 85%, or at least 90%, or at least 95%, or at least 97%, or at least 98%, or at least 99%, or at least 100% (all percents being by weight based on total weight of the first component) of the first component of the fiber can be the ethylene/alpha-olefin interpolymer. The remainder of the first component may be additional components such as one or more other polymers and/or one or more additives. Other polymers could be another polyethylene (e.g. polyethylene homopolymer or ethylene/alpha-olefin interpolymer), propylene-based polymer (e.g. polypropylene homopolymer, propylene-ethylene copolymer, or propylene/alpha-olefin interpolymer). The amount of the other polymer may be up to 25%. Potential additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, UV stabilizers, anti-blocks, slip agents, tackifiers, fire retardants, antimicrobial agents, odor reducer agents, anti-fungal agents, and combinations thereof. The ethylene/alpha-olefin interpolymer composition may contain from about 0.01 to about 25 or to about 20 or to about 15 or to about 10 percent by the combined weight of such additives, based on the weight of the ethylene/alpha-olefin interpolymer composition including such additives.

The first component can the only component of the fiber such that the fiber is a monocomponent fiber. The monocomponent fibers may be mono-constituent, i.e., only the ethylene/alpha-olefin interpolymer composition; or in the alternative, the monocomponent fibers may be multi-constituent, i.e. a blend of the ethylene/alpha-olefin interpolymer composition and one or more other polymers.

There can also a second component to the fiber such that the fiber is a bicomponent fiber. There can be additional components forming a multicomponent fiber. The components are found in different regions. Exemplary bi-component fibers include, but are not limited to, sheath/core, islands in the sea, segmented pie, side by side and combination thereof. For example, the inventive fibers may include the ethylene/alpha-olefin interpolymer composition according to the instant invention as an outer layer, e.g. sheath, alone or in combination with one or more polymers. The term outer layer, as used herein, refers to at least any portion of the fiber surface. The inventive fibers may include the ethylene/alpha-olefin interpolymer composition according to the instant invention as an inner layer, e.g. core, alone or in combination with one or more polymers. The weight ratio of the first component or region to the second component or region can be at least 5/95 or at least 10/90 or at least 20/80 or at least 30/70 or at least 40/60 and can be no more than 95/5 or no more than 90/10 or no more than 80/20 or no more than 70/30 or no more than 60/40.

The second component in a multicomponent system can comprise a different polyolefin, such as polypropylene, or polyester (e.g. polyethylene terephthalate or polybutylene terephthalate) with or without additives as described above.

The fibers as taught herein can be formed by any conventional spinning technique including melt spinning. The ethylene/alpha-olefin interpolymer composition can be formed into monocomponent or bicomponent fibers via different techniques, for example, via melt spinning. Such fibers can be continuous filaments, or in the alternative, can be staple fibers. Continuous filaments can further be crimped and/or stretched, and then cut to produce staple fibers. In melt spinning, one or more polymers can be melted, extruded (or coextruded if a multicomponent fiber) and forced through the fine orifices in a metallic plate called spinneret into air or other gas, where it is cooled and solidified forming the inventive mono- or bi-component fibers. The solidified filaments can be drawn off via air jets, rotating rolls, or godets, and can be laid on a conveyer belt as a web.

The inventive mono- or bi-component fibers according to the present invention may be formed into non-woven fabrics. The non-woven fabrics according to the instant invention may be fabricated via different techniques. Such methods include, but are not limited to, spunbond process, carded web process or an airlaid process and bonded by a process including, but not limited to, thermo-calendering process, adhesive bonding process, hot air bonding process, needle punch process, hydroentangling process, and combinations thereof. The fabrics can be further laminated to other non-wovens or films in a variety of lamination techniques such as adhesive lamination, thermal lamination, extrusion lamination, needle punching, hydroentangling and combinations thereof. Advantageously, the non-woven disclosed herein may be formed directly from the constituent polymer material(s) by spunbond processing. In a spunbond process, the fabrication of non-woven fabric includes the following steps: (a) extruding strands of one or more polymeric compositions from a spinneret; (b) quenching the strands of the one or more polymeric compositions with a flow of air which is generally cooled in order to hasten the solidification of the molten strands of the one or more polymeric compositions; (c) attenuating the filaments by advancing them through the quench zone with a draw tension that is applied by pneumatically entraining the filaments in an air stream; (d) collecting the drawn strands into a web on a foraminous surface, e.g. moving screen or porous belt; and (e) bonding the web of loose strands into the non-woven fabric. Bonding can be achieved by a variety of means including, but not limited to, thermo-calendering process, adhesive bonding process, hot air bonding process, needle punch process, hydroentangling process, and combinations thereof.

The fibers as disclosed herein can have the following characteristics:

The fibers can have diameters of at least 3 microns, or at least 5 microns or at least 10 microns and less than 50 microns, or less than 30 microns.

The fibers can have a denier per filament in the range of less than 50 g/9000 m. All individual values and subranges from less than 50 g/9000 m are included herein and disclosed herein; for example, the denier per filament can be from a lower limit of 0.1, 0.5, 1, 5, 10, 15, 17, 20, 25, 30, 33, 40, or 44 g/9000 m to an upper limit of 0.5, 1, 5, 10, 15, 17, 20, 25, 30, 33, 40, 44, or 50 g/9000 m. For example, the fibers may have a denier per filament in the range of less than 40 g/9000 m; or in the alternative, the fibers may have a denier per filament in the range of less than 30 g/9000 m; or in the alternative, the fibers may have a denier per filament in the range of less than 10 g/9000 m; or in the alternative, the fibers may have a denier per filament in the range of less than 5 g/9000 m; or in the alternative, the fibers may have a denier per filament in the range from 0.5 to 5 g/9000 m.

The fibers can be spun at relatively high filament speed without fiber break. For example, the monocomponent fibers can withstand a filament speed in the range of at least 2000 meter per minute (mpm), for example, at least 2500 mpm, or at least 3000 mpm, or at least 3500 mpm, during the melt spinning step of the spunbond process.

In a spunbond process, the inventive monocomponent fibers can achieve a filament speed above 2600 meter per minute. In a staple fiber process wherein the draw tension is applied by wrapping the fibers around mechanical draw rolls, the inventive bicomponent fibers have a final denier less than 1.7 g/9000 m, or less than 1.5, or less than 1.0.

The non-wovens as disclosed herein have the following characteristics:

The monocomponent fabrics as disclosed herein can provide relatively high abrasion resistant fabrics. The disclosed ethylene/alpha olefin interpolymer also provides good processability and spinnability. The low levels of vinyl unsaturations in the ethylene/alpha-olefin interpolymer composition are also important because such low levels of the vinyl unsaturations provide the instant ethylene/alpha-olefin interpolymer composition with improved processability. The bicocomponent fabrics as disclosed herein provide a good property balance in tensile strength and abrasion resistance. When used in a staple fiber process, the inventive bicomponent fibers according to the instant invention further have good processability/stretchability and thus finer denier.

The mono-component fiber nonwovens as disclosed herein can exhibit a fuzz/abrasion of less than about 0.5 mg/cm$^2$, or less than about 0.2 mg/cm$^2$. For bicomponent fiber nonwovens as disclosed herein, the fuzz/abrasion is preferably less than about 0.1 mg/cm$^2$. It should be understood that the fuzz/abrasion will depend in part on the basis weight of the nonwoven as heavier fabrics will naturally produce more fuzz in the testing protocol.

The spunbond non-woven fabrics can be formed into multilayer or laminate structures. Such multilayer structures comprise at least 2 or more layers, wherein at least one or more layers are spunbond non-wovens as disclosed herein, and one or more other layers are selected from one or more meltblown non-woven layers, one or more wet-laid non-woven layers, one or more air-laid non-woven layers, one or more webs produced by any nonwoven or melt spinning process, one or more film layers, such as cast film, blown film, one or more coating layers derived from a coating composition via, for example, extrusion coating, spray coating, gravure coating, printing, dipping, kiss rolling, or blade coating. The laminate structures can be joined via any number of bonding methods; thermal bonding, adhesive lamination, hydro entangling, needle punching. Structures can range from S to SX, or SXX, or SXXX, or SXXXX, or SXXXXX, where S is the non-woven as disclosed herein and X can be a film, coating, or other non-woven material in any combination or one or more of X could also be S. Additional spunbond layers can be made from the ethylene/alpha-olefin interpolymer composition, as described herein, and optionally in combinations with one or more polymers and/or additives.

In the case of the staple or binder fibers, the fibers can be mixed with a variety of other fibers including synthetic fibers such as PE, PP, PET, or natural fibers such as cellulose, rayon, or cotton. These fibers can be wet laid, air laid or carded into a non-woven web. The non-woven web can then be laminated to other materials.

The spunbond non-woven fabrics can be used in various end-use application including, but not limited to, hygiene absorbent products such diapers, feminine hygiene articles, adult incontinence products, wipes, bandages and wound dressings, and disposable slippers and footwear, medical application such as isolation gowns, surgical gowns, surgical drapes and covers, surgical scrub suits, caps, masks, and medical packaging.

Testing Methods

Density

Density measurements for the ethylene/alpha-olefin interpolymers are made in accordance with ASTM D792, Method B.

Melt Index (I2) and (I10)

Melt index (I2) values for the ethylene/alpha-olefin interpolymers are measured in accordance with ASTM D1238 at 190° C. at 2.16 kg. Similarly, melt index (I10) values for the ethylene/alpha-olefin interpolymers are measured in accordance with ASTM D1238 at 190° C. at 10 kg. The values are reported in g/10 min, which corresponds to grams eluted per 10 minutes.

Dynamic Mechanical Spectroscopy (DMS)

Samples are compression-molded into 3 mm thick×25 mm diameter circular plaque at 177° C. for five minutes, under 10 MPa pressure. The sample are then taken out of the press and placed on a countertop to cool. Constant temperature, frequency sweep measurements are performed on the compression molded plaques with an ARES strain controlled rheometer (TA Instruments), equipped with 25 mm parallel plates, under a nitrogen purge. For each measurement, the rheometer is thermally equilibrated, for at least 30 minutes, prior to zeroing the gap. The sample disk is placed on the plate, and allowed to melt for five minutes at 190° C. The plates are then closed to 2 mm gap, the sample is trimmed, and then the test is started. The method can have an additional five minute delay built in, to allow for temperature equilibration. The experiments are performed at 190° C., over a frequency range from 0.1 to 100 radian/second, at five points per decade interval. The strain amplitude is constant at 10%. The stress response is analyzed in terms of amplitude and phase, from which the storage modulus (G'), loss modulus (G"), complex modulus (G*), dynamic viscosity ($\eta$*), and tan $\delta$ (or tan delta) are calculated. Tan delta at 1 radian/second and tan delta at 100 radian/second are obtained.

Improved Comonomer Composition Distribution (ICCD)

The Improved Comonomer Composition Distribution (ICCD) test is performed with Crystallization Elution Fractionation instrumentation (CEF) (PolymerChar, Spain) equipped with IR-5 detector (PolymerChar, Spain) and two-angle light scattering detector Model 2040 (Precision Detectors, currently Agilent Technologies). The ICCD column is packed with gold coated nickel particles (Bright 7GNM8-NiS, Nippon Chemical Industrial Co.) in a 15 cm (length)×¼" (ID) stainless tubing. The column packing and conditioning are with a slurry method according to the reference (Cong, R.; Parrott, A.; Hollis, C.; Cheatham, M. WO2017040127A1). The final pressure with trichlorobenzene (TCB) slurry packing is 150 bars. The column is installed just before IR-5 detector in the detector oven. Ortho-dichlorobenzene (ODCB, 99% anhydrous grade or technical grade) is used as eluent. Silica gel 40 (particle size 0.2~0.5 mm, catalogue number 10181-3) is obtained from EMD Chemicals and can be used to dry ODCB solvent The ICCD instrument is equipped with an autosampler with nitrogen ($N_2$) purging capability. ODCB is sparged with dried $N_2$ for one hour before use. Sample preparation is done with autosampler at 4 mg/ml (unless otherwise specified) under shaking at 160° C. for 1 hour. The injection volume is 3000 The temperature profile of ICCD is: crystallization at 3° C./min from 105° C. to 30° C., then thermal equilibrium at 30° C. for 2 minutes (including Soluble Fraction Elution Time being set as 2 minutes), followed by heating at 3° C./min from 30° C. to 140° C. The flow rate during elution is 0.50 ml/min. Data are collected at one data point/second. Column temperature calibration can be performed by using a mixture of the reference material linear homopolymer polyethylene (having zero comonomer content, melt index (I2) of 1.0 g/10 min, polydispersity $M_{w(GPC)}/M_{n(GPC)}$ approximately 2.6 by conventional gel permeation chromatography, 1.0 mg/ml) and Eicosane (2 mg/ml) in ODCB. ICCD temperature calibration consists of four steps: (1) Calculating the delay volume defined as the temperature offset between the measured peak elution temperature of Eicosane minus 30.00° C.; (2) Subtracting the temperature offset of the elution temperature from the ICCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference has a peak temperature at 101.0° C., and Eicosane has a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content calibration curve (comonomer content in mole percent versus elution temperature (T)) of ICCD is constructed by using 12 reference materials (a linear ethylene homopolymer and 11 ethylene-octene random copolymers made with single site metallocene catalyst, having a weight average molecular weight ranging from 35,000 to 128,000 g/mol) with known comonomer contents. All of these reference materials are analyzed in the same way as specified previously at 4 mg/mL. The comonomer content in mole percent and its peak temperature on the elution curve follows $$\ln(1 - \text{comonomer content(mol \%)}) = -\frac{208.328(° \text{ C.})}{273.15(° \text{ C.}) + T(° \text{ C.})} + 0.55846 \qquad \text{Eq. 1}$$

Determination of Peaks and Full Width at Half Maximum on the ICCD Elution Profile A single baseline is subtracted from the IR measurement signal in order to create a relative mass-elution profile plot starting and ending at zero relative mass at its lowest and highest elution temperatures (typically between 35° C. and 119° C.). For convenience, this is presented as a normalized quantity with respect to an overall area equivalent to 1. In the relative mass-elution profile plot from ICCD, a weight fraction ($w_T(T)$) at each temperature (T) can be obtained. The profile ($w_T(T)$ vs. T) is from 35.0° C. to 119.0° C. with a temperature step increase of 0.200° C. from the ICCD, and follows $$\int_{35.0}^{119.0} w_T(T) dT = 1 \qquad \text{Eq. 2}$$

On the $w_T(T)$ vs. T elution profile, a single peak is defined as a curve with one Highest Point in the middle and two Lowest Points on two sides (lower temperature side and higher temperature side). Both heights of the two Lowest Points need to be lower than the height of the Highest Point by at least 10%. If one or both of the Lowest Points have a height less than 10% lower than the height of the Highest Point, i.e. one or both of the Lowest Points have a height greater than 90% of the height of the Highest Point, such a curve is considered a shoulder associated with another peak, but is not a peak itself. Each separate peak is then measured for width in degree C. at 50% of the maximum height of that peak in the $w_T(T)$ vs. T elution profile plot. This width is called the full width at half maximum of the peak.

If the ICCD elution profile has multiple peaks, the separation points ($T_{separation}$) between the peaks can be defined as the Lowest Points of the adjacent two peaks. The weight fraction of the nth peak ($WT_{peak\ n}$) can be calculated according to the following equations $$WT_{peak\ 1} = \int_{35.0}^{T_{separation,1}} w_T(T)dT \qquad \text{(Eq. 3a)}$$

$$WT_{peak\ 2} = \int_{T_{separation,1}}^{T_{separation,2}} w_T(T)dT \qquad \text{(Eq. 3b)}$$

$$WT_{peak\ n} = \int_{T_{separation,n-1}}^{119.0} w_T(T)dT \qquad \text{(Eq. 3c)}$$

where the peak 1, peak 2, . . . , and peak n are the peaks in the order from low temperature to high temperature, and the $T_{separation,\ n}$ is the separation point between the n peak and n+1 peak.

Full width at half maximum is defined as the temperature difference between the first intersection of the front temperature and the first intersection of the rear temperature at half of the maximum peak height of that individual peak. The front temperature at the half of the maximum peak is searched forward from 35.0° C., while the rear temperature at the half of the maximum peak is searched backward from 119.0° C.

Comonomer Distribution Constant (CDC)

Comonomer distribution constant (CDC) is calculated from $w_T(T)$ vs. T elution profile by ICCD according to the following steps shown graphically as FIG. 1:

(1) Obtain $w_T(T)$ vs. T elution profile from ICCD in the range from 35.0° C. to 119.0° C. with a temperature step increase of 0.200° C. Total weight fraction from 35° C. to 119° C. is normalized to 1.0 and should follow Equation 2.

(2) Calculate the median temperature ($T_{median}$) at cumulative weight fraction of 0.500, according to the following formula:

$$\int_{35.0}^{T_{median}} w_T(T)dT = 0.5 \qquad \text{Eq. 4}$$

(3) Calculate the corresponding median comonomer content in mole % ($C_{median}$) at the median temperature ($T_{median}$) by using comonomer content calibration curve according to Equation 1.

(4) Composition Distribution Breadth Index (CDBI) is defined as the total weight fraction of polymer chains with a comonomer content ranging from $0.5*C_{median}$ to $1.5*C_{median}$ from 35.0° C. to 119.0° C. Find the corresponding temperature T1 for $0.5*C_{median}$ and the corresponding temperature T2 for $1.5*C_{median}$ based on Equation 1. Composition Distribution Breadth Index (CDBI) can be obtained from the weight fraction ($w_T(T)$) vs. temperature (T) plot between T1 and T2 as $\int_{T2}^{T1} w_T(T)dT$. If $T_{median}$ is higher than 98.0° C., Composition Distribution Breadth Index (CDBI) is defined as 0.95;

(5) Obtain the temperature at the maximum peak height ($T_p$) from $w_T(T)$ vs. T profile of ICCD by searching each data point for the highest peak from 35.0° C. to 119.0° C. (if the two peaks are identical in height, then the lower temperature peak is selected); When the difference in the peak temperatures is equal to or greater than 1.1 times of the sum of full width at half maximum of each peak, the Half Width of the interpolymer composition is calculated as the arithmetic average of the full width at half maximum of each peak. If the difference in the peak temperatures is less than 1.1 times of the sum of full width at half maximum of each peak, the Half Width of the interpolymer composition is defined as the full width at half maximum of the highest temperature peak.

(6) Calculate the standard deviation of temperature (Stdev) according to the following formula:

$$Stdev = \sqrt[2]{\int_{35}^{119}(T-T_p)^2 \times w_T(T)dT} \qquad \text{Eq. 5}$$

(7) Comonomer distribution constant (CDC) is calculated from the following equation $$CDC = \frac{\text{Composition Distribution Breath Index}}{\text{Half Width}/Stdev} \times 100 \qquad \text{Eq. 6}$$

Conventional Gel Permeation Chromatography (Conventional GPC) and MWCDI

The chromatographic system consists of a PolymerChar GPC-IR (Valencia, Spain) high temperature GPC chromatograph equipped with an internal IR5 infra-red detector (IR5). The autosampler oven compartment is set at 160° C. and the column compartment is set at 150° C. The columns used are 4 Agilent "Mixed A" 30 cm 20-micron linear mixed-bed columns. The chromatographic solvent used is 1,2,4 trichlorobenzene and contains 200 ppm of butylated hydroxytoluene (BHT). The solvent source is nitrogen sparged. The injection volume used is 200 microliters and the flow rate is 1.0 milliliter/minute.

Calibration of the GPC column set is performed with at least 20 narrow molecular weight distribution polystyrene standards with molecular weights ranging from 580 to 8,400,000 g/mol and are arranged in 6 "cocktail" mixtures with at least a decade of separation between individual molecular weights. The standards are purchased from Agilent Technologies. The polystyrene standards are prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards are dissolved at 80° C. with gentle agitation for 30 minutes. The polystyrene standard peak molecular weights are converted to ethylene/alpha-olefin interpolymer molecular weights using the following equation (as described in Williams and Ward, J. Polym. Sci., Polym. Let., 6, 621 (1968)):

$$M_{polyethylene} = A \times (M_{polystyrene})^B \qquad \text{(Eq. 7)}$$

where M is the molecular weight, A has a value of 0.4315 and B is equal to 1.0.

A fifth order polynomial is used to fit the respective ethylene/alpha-olefin interpolymer-equivalent calibration points. A small adjustment to A (from approximately 0.39 to 0.44) is made to correct for column resolution and band-broadening effects such that NIST standard NBS 1475 is obtained at a molecular weight of 52,000 g/mol.

The total plate count of the GPC column set is performed with Eicosane (prepared at 0.04 g in 50 milliliters of TCB and dissolved for 20 minutes with gentle agitation). The plate count (Equation 8) and symmetry (Equation 9) are measured on a 200 microliter injection according to the following equations:

$$\text{Plate Count} = 5.54 \times \left(\frac{RV_{Peak\ Max}}{\text{Peak Width at half height}}\right)^2 \qquad \text{(Eq. 8)}$$

where RV is the retention volume in milliliters, the peak width is in milliliters, the Peak Max is the maximum height of the peak, and half height is one half of the height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{(Eq. 9)}$$

where RV is the retention volume in milliliters and the peak width is in milliliters, Peak max is the maximum position of the peak, one tenth height is one tenth of the height of the peak maximum, and where rear peak refers to the peak tail at later retention volumes than the Peak max and where front peak refers to the peak front at earlier retention volumes than the Peak max. The plate count for the chromatographic system should be greater than 22,000 and symmetry should be between 0.98 and 1.22.

Samples are prepared in a semi-automatic manner with the PolymerChar "Instrument Control" Software, wherein the samples are weight-targeted at 2 mg/ml, and the solvent (contained 200 ppm BHT) is added to a pre nitrogen-sparged septa-capped vial, via the PolymerChar high temperature autosampler. The samples are dissolved for 3 hours at 160° C. under "low speed" shaking.

The calculations of $M_{n(GPC)}$, $M_{w(GPC)}$, and $M_{z(GPC)}$ are based on GPC results using the internal IR5 detector (measurement channel) of the PolymerChar GPC-IR chromatograph according to Equations 11a-c, using PolymerChar GPCOne™ software, the baseline-subtracted IR chromatogram at each equally-spaced data collection point i ($IR_i$) and the ethylene/alpha-olefin interpolymer equivalent molecular weight obtained from the narrow standard calibration curve for the point i ($M_{polyethylene,i}$ in g/mol) from Equation 7. Subsequently, a GPC molecular weight distribution (GPC-MWD) plot ($wt_{GPC}$(lgMW) vs. lgMW plot, where $wt_{GPC}$(lgMW) is the weight fraction of the interpolymer molecules with a molecular weight of lgMW) can be obtained. Molecular weight is in g/mol and $wt_{GPC}$(lgMW) follows the Equation 10.

$$\int wt_{GPC}(lg\ MW)d\ lg\ MW = 1.00 \quad \text{(Eq. 10)}$$

Number-average molecular weight $M_{n(GPC)}$, weight-average molecular weight $M_{w(GPC)}$ and z-average molecular weight $M_{z(GPC)}$ can be calculated as the following equations.

$$Mn_{(GPC)} = \frac{\sum_i^i IR_i}{\sum_i^i (IR_i / M_{polyethylene,i})} \quad \text{(Eq. 11a)}$$

$$Mw_{(GPC)} = \frac{\sum_i^i (IR_i * M_{polyethylene,i})}{\sum_i^i IR_i} \quad \text{(Eq. 11b)}$$

$$Mz_{(GPC)} = \frac{\sum_i^i (IR_i * M_{polyethylene,i}^2)}{\sum_i^i (IR_i * M_{polyethylene,i})} \quad \text{(Eq. 11c)}$$

In order to monitor the deviations over time, a flow rate marker (decane) is introduced into each sample via a micropump controlled with the PolymerChar GPC-IR system. This flow rate marker (FM) is used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 12. Processing of the flow marker peak is done via the PolymerChar GPCOne™ Software. Acceptable flow rate correction is such that the effective flowrate should be within 0.5% of the nominal flowrate.

$$\text{Flow rate}_{effective} = \text{Flow rate}_{nominal} \times (RV(FM_{calibrated})/RV(FM_{Sample})) \quad \text{(Eq. 12)}$$

A calibration for the IR5 detector ratioing can be performed using at least eight ethylene/alpha-olefin interpolymer standards (one polyethylene homopolymer and seven ethylene/octene copolymers) of known short chain branching (SCB) frequency (measured by the 13C NMR Method), ranging from homopolymer (0 SCB/1000 total C) to approximately 50 SCB/1000 total C, where total C=carbons in backbone+carbons in branches. Each standard has a weight-average molecular weight from 36,000 g/mol to 126,000 g/mol, as determined by GPC. Each standard has a molecular weight distribution ($M_{w(GPC)}/M_{n(GPC)}$) from 2.0 to 2.5, as determined by GPC. The "IR5 Area Ratio (or "IR5 Methyl Channel Area/IR5 Measurement Channel Area")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) is calculated for each of the "SCB" standards. A linear fit of the SCB frequency versus the "IR5 Area Ratio" is constructed in the form of the following equation:

$$SCB/1000\ total\ C = A_0 + [A_1 \times (IR5_{Methyl\ Channel\ Area}/IR5_{Measurement\ Channel\ Area})] \quad \text{(Eq.13)}$$

where $A_0$ is the SCB/1000 total C intercept at an "IR5 Area Ratio" of zero, and $A_1$ is the slope of the SCB/1000 total C versus "IR5 Area Ratio" and represents the increase in the SCB/1000 total C as a function of "IR5 Area Ratio."

A series of linear baseline-subtracted chromatographic heights for the chromatogram generated by the "IR5 methyl channel sensor" are established as a function of column elution volume, to generate a baseline-corrected chromatogram (methyl channel). A series of linear baseline-subtracted chromatographic heights for the chromatogram generated by the "IR5 measurement channel" are established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" is calculated at each column elution volume index (each equally-spaced index, representing 1 data point per second at 1 ml/min elution) across the sample integration bounds. The "IR5 Height Ratio" is multiplied by the coefficient A1, and the coefficient A0 is added to this result, to produce the predicted SCB frequency of the sample. The result is converted into mole percent comonomer as follows in Equation 14:

$$\text{Mole Percent Comonomer} = \{SCB_f / [SCB_f + ((1000 - SCB_f * \text{Length of comonomer})/2)]\} * 100 \quad \text{(Eq. 14)},$$

where "$SCB_f$" is the "SCB per 1000 total C", and the "Length of comonomer" is the number of carbons of the comonomer, e.g. 8 for octene, 6 for hexene, and so forth.

Each elution volume index is converted to a molecular weight value (Mwi) using the method of Williams and Ward (described above; Equation 7). The "Mole Percent Comonomer" is plotted as a function of lg(Mwi), and the slope is calculated between Mwi of 20,000 and Mwi of 200,000 g/mol (end group corrections on chain ends are omitted for this calculation). Linear regression is used to calculate the slope between, and including, Mwi from 20,000 to 200,000 g/mol, wherein the height of the concentration chromatogram ($wt_{GPC}$(lgMW) vs. lgMW plot) is at least 10% of the peak height of the chromatogram. This slope is defined as the molecular weighted comonomer distribution index (MWCDI).

Zero-Shear Viscosity Ratio (ZSVR)

Zero-shear viscosity ratio is defined as the ratio of the zero-shear viscosity (ZSV) of the branched polyethylene material to the ZSV of a linear polyethylene material (see ANTEC proceeding below) at the equivalent weight average molecular weight ($M_{w(GPC)}$), according to the following equation:

$$ZSVR = \frac{\eta_{0B}}{\eta_{0L}} = \frac{\eta_{0B}}{2.29 \times 10^{-15} \text{Pa} \cdot \text{sec} \cdot \left(\frac{g}{\text{mol}}\right)^{-3.65} \times M_{w(GPC)}^{3.65}}. \quad \text{(Eq. 15)}$$

The ZSV value of the interpolymer ($\eta_{0B}$) is obtained from creep test, at 190° C., via the method described below. The $M_{w(GPC)}$ value is determined by the conventional GPC method (Equation 11b), as discussed above. The correlation between ZSV of linear polyethylene ($\eta_{0L}$) and its $M_{w(GPC)}$ is established based on a series of linear polyethylene reference materials. A description for the ZSV-$M_{w(GPC)}$ relationship can be found in the ANTEC proceeding: Karjala et al., *Detection of Low Levels of Long-chain Branching in Polyolefins*, Annual Technical Conference Society of Plastics Engineers (2008), 66th 887-891.

Creep Test

The ZSV value of the interpolymer ($\eta_{0B}$) is obtained from a constant stress rheometer creep test at 190° C. in a nitrogen environment using DHR, TA Instrument. The samples are subjected to flow between two 25 mm diameter plate fixtures positioned parallel to each other. Samples are prepared by compression molding pellets of the interpolymer into circular plaques of about 1.5-2.0 mm thick. The plaques are further cut into 25 mm diameter disks and sandwiched between the plate fixtures of the TA Instrument. The oven on the TA instrument is closed for 5 minutes after sample loading and before setting the gap between the plate fixtures to 1.5 mm, opening the oven to trim the edges of the sample, and reclosing the oven. A logarithmic frequency sweep between 0.1 to 100 radians/second at 190° C., 300 seconds of soak time, and 10% strain is conducted before and after the creep test to determine whether the sample has degraded. A constant low shear stress of 20 Pa is applied for all of the samples, to ensure that the steady state shear rate is low enough to be in the Newtonian region. Steady state is determined by taking a linear regression for the data in the last 10% time window of the plot of "lg (J(t)) vs. lg(t)", where J(t) is creep compliance and t is creep time. If the slope of the linear regression is greater than 0.97, steady state is considered to be reached, then the creep test is stopped. In all cases in this study, the slope meets the criterion within one hour. The steady state shear rate is determined from the slope of the linear regression of all of the data points, in the last 10% time window of the plot of "ε vs. t", where ε is strain. The zero-shear viscosity is determined from the ratio of the applied stress to the steady state shear rate.

$^1$H NMR Method

A stock solution (3.26 g) is added to 0.133 g of the polymer sample in 10 mm NMR tube. The stock solution is a mixture of tetrachloroethane-d2 (TCE) and perchloroethylene (50:50 in weight) with 0.001M $Cr^{3+}$. The solution in the tube is purged with $N^2$, for 5 minutes, to reduce the amount of oxygen. The capped sample tube is left at room temperature, overnight, to swell the polymer sample. The sample is dissolved at 110° C. with periodic vortex mixing. The samples are free of the additives that may contribute to unsaturation, for example, slip agents such as erucamide. Each $^1$H NMR analysis is run with a 10 mm cryoprobe, at 120° C., on Bruker AVANCE 400 MHz spectrometer.

Two experiments are run to measure unsaturation: one control and one double presaturation experiment. For the control experiment, the data are processed with an exponential window function with 1 Hz line broadening and the baseline is corrected from about 7 to −2 ppm. The signal from residual 1H of TCE is set to 100, the integral (Itotal) from about −0.5 to 3 ppm is used as the signal from the whole polymer in the control experiment. The number of total carbons, NC, in the polymer is calculated as follows in Equation 16:

$$NC = I_{total}/2 \quad \text{(Eq. 16)}$$

For the double presaturation experiment, the data are processed with an exponential window function with 1 Hz line broadening, and the baseline is corrected from about 6.6 to 4.5 ppm. The signal from residual $^1$H of TCE is set to 100, and the corresponding integrals for unsaturations ($I_{vinylene}$, $I_{trisubstituted}$, $I_{vinyl}$ and $I_{vinylidene}$) are integrated. It is well known to use NMR spectroscopic methods for determining polyethylene unsaturation, for example see Busico, V., et al., *Macromolecules*, 2005, 38, 6988. The number of unsaturation unit for vinylene, trisubstituted, vinyl and vinylidene are calculated as follows:

$$N_{vinylene} = I_{vinylene}/2 \quad \text{(Eq. 17)},$$

$$N_{trisubstituted} = I_{trisubstitute} \quad \text{(Eq. 18)},$$

$$N_{vinyl} = I_{vinyl}/2 \quad \text{(Eq. 19)},$$

$$N_{vinylidene} = I_{vinylidene}/2 \quad \text{(Eq. 20)}.$$

The unsaturation units per 1,000 total carbons, i.e., all polymer carbons including backbone and branches, are calculated as:

$$N_{vinylene}/1{,}000C = (N_{vinylene}/NC)*1{,}000 \quad \text{(Eq. 21)},$$

$$N_{trisubstituted}/1{,}000C = (N_{trisubstituted}/NC)*1{,}000 \quad \text{(Eq. 22)},$$

$$N_{vinyl}/1{,}000C = (N_{vinyl}/NCH_2)*1{,}000 \quad \text{(Eq. 23)},$$

$$N_{vinylidene}/1{,}000C = (N_{vinylidene}/NC)*1{,}000 \quad \text{(Eq. 24)}.$$

The chemical shift reference is set at 6.0 ppm for the $^1$H signal from residual proton from TCE-d2. The control is run with a ZG pulse, NS=4, DS=12, SWH=10,000 Hz, AQ=1.64 s, D1=14 s. The double presaturation experiment is run with a modified pulse sequence, with O1P=1.354 ppm, O2P=0.960 ppm, PL9=57 db, PL21=70 db, NS=100, DS=4, SWH=10,000 Hz, AQ=1.64 s, D1=1 s (where D1 is the presaturation time), D13=13 s.

$^{13}$C NMR Method

The samples are prepared by adding approximately 3 g of a 50/50 mixture of tetrachloroethane-d2/orthodichlorobenzene, containing 0.025 M Cr(AcAc)$_3$, to a 0.25 g polymer sample in a Norell 1001-7 10 mm NMR tube. Oxygen is removed from the sample by purging the tube headspace with nitrogen. The samples are then dissolved and homogenized by heating the tube and its contents to 150° C. using a heating block and heat gun. Each sample is visually inspected to ensure homogeneity. Samples are thoroughly mixed immediately prior to analysis, and are not allowed to cool before insertion into the heated NMR probe. This is necessary to ensure the sample is homogeneous and representative of the whole. All data are collected using a Bruker 400 MHz spectrometer equipped with a Bruker cryoprobe. The data are acquired using a 6 second pulse repetition delay, 90-degree flip angles, and inverse gated decoupling with a sample temperature of 120° C. All measurements are made on non-spinning samples in locked mode. Samples are allowed to thermally equilibrate for 7 minutes prior to data acquisition. The 13C NMR chemical shifts are internally referenced to the EEE triad at 30 ppm.

C13 NMR comonomer Content: It is well known to use NMR spectroscopic methods for determining polymer composition. ASTM D 5017-96; J. C. Randall et al., in "NMR and Macromolecules" ACS Symposium series 247; J. C. Randall, Ed., Am. Chem. Soc., Washington, D.C., 1984, Ch. 9; and J. C. Randall in "Polymer Sequence Determination", Academic Press, New York (1977) provide general methods of polymer analysis by NMR spectroscopy.

Tensile Test on Nonwoven Fabrics

For tensile testing, the nonwoven fabrics are cut into 1 inch×8 inch rectangular strips in the machine direction (MD) for tensile testing using an Instron tensile tester. The strips are tested at a test speed of 300 mm/min with a grip to grip distance of 76.2 mm. The tensile strength is determined at the peak force. The same is repeated for the cross direction (CD). Average value of 5 samples is reported.

Fuzz Test on Nonwoven Fabrics

Abrasion or fuzz resistance of the spunbond fabrics can be measured using the Sutherland Ink Rub Tester. Prior to testing, the samples are cut into 12.5 cm×5 cm rectangular strips and are conditioned for a minimum of four hours at 73° F.+/−2 and constant relative humidity. A 12.5 cm×5 cm rectangular strip of 320-grit aluminum oxide cloth sandpaper is then mounted on the Sutherland Ink Rub Tester. The sample is then weighed to the nearest 0.01 mg and mounted onto the Tester. A 2 pound weight is then attached to the Sutherland Ink Rub Tester and the tester is run at a rate of 42 cycles per minute, for 20 cycles. Loose fibers are removed using adhesive tape, and the sample is re-weighed to determine the amount of material lost. Fuzz is defined as the material loss in weight divided by the size of the abraded area. Unit of fuzz is mg/cm$^2$. Average value of 5 samples is reported.

Tensile Test on the Fiber Yarns

The test is conducted according to ISO 2062. Spun yarns are tested at 23° C. The tensile properties are determined on a Zwick tensile tester using a gauge length of 200 mm and a rate of elongation of 200 mm/min. Tenacity and extensibility are determined at break force. At the break load, elongation is read and reported as elongation at break. Average value of 5 samples is reported.

Denier Measurement

Fiber size is measured via optical microscopy. Denier (defined as the weight of such fiber for 9000 meter) is calculated based on the density of each polymer component and fiber size.

Filament Speed Determination

Filament speed is calculated based on the following equation:

$$\text{Filament Speed (meter per minute)} = \text{throughput rate (g/min)/denier(g/9000m)} * 9{,}000 \quad \text{(Eq. 25)}$$

EXAMPLES

Examples 1-3—Production of Ethylene/Alpha-Olefin Interpolymer Compositions

All raw materials (ethylene monomer and 1-octene comonomer) and the process solvent (a narrow boiling range high-purity isoparaffinic solvent, product name Isopar-E commercially available from ExxonMobil Chemical) are purified with molecular sieves before introduction into the reaction environment. Hydrogen is supplied pressurized as a high purity grade and is not further purified. The reactor ethylene feed stream is pressurized via a mechanical compressor to above reaction pressure. The solvent and comonomer feed are pressurized via a pump to above reaction pressure. The individual catalyst components are manually batch diluted to suitable component concentrations with purified solvent and pressured to above reaction pressure. All reaction feed flows are measured with mass flow meters and independently controlled with computer automated valve control systems.

A two reactor system is used in a series configuration. Each continuous solution polymerization reactor consists of a liquid full, non-adiabatic, isothermal, circulating, loop reactor which mimics a continuously stirred tank reactor (CSTR) with heat removal. Independent control of all fresh solvent, ethylene, hydrogen, and catalyst component feeds is possible. The total fresh feed stream to each reactor (solvent, ethylene, 1-octene, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactor through specially designed injection stingers. The primary catalyst (pre-catalyst) component feed is computer controlled to maintain each reactor ethylene conversion at the specified targets. The cocatalyst components are fed based on calculated specified molar ratios to the primary catalyst (pre-catalyst) component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

In dual series reactor configuration the effluent from the first polymerization reactor (containing solvent, ethylene, 1-octene, hydrogen, catalyst components, and polymer) exits the first reactor loop and is added to the second reactor loop.

The second reactor effluent enters a zone where it is deactivated with the addition of and reaction with water. Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted 1-octene is recycled back to the reactor after passing through a purification system. A small amount of solvent and 1-octene is purged from the process.

The reactor stream feed data flows that correspond to the values in Table 1 are used to produce the examples. The data are presented such that the complexity of the solvent recycle system is accounted for and the reaction system can be treated more simply as a once through flow diagram. Catalyst components used are referenced in Table 2.

Each of the polymers made is tested for various properties according to the methods set forth above. In addition, ASPUN™ 6000 a bimodal ethylene/octene copolymer manufactured by the Dow Chemical Company and ASPUN™ 6850 a unimodal ethylene/octene copolymer manufactured by the Dow Chemical Company are tested. Results are shown in Table 3.

TABLE 1

Production Conditions of Ex. 1-3

| | | Ex. 1 | Ex. 2 | Ex. 3 |
|---|---|---|---|---|
| First Reactor Feed Solvent/Ethylene Mass Flow Ratio | g/g | 3.3 | 3.1 | 3.1 |
| First Reactor Feed 1-octene/Ethylene Mass Flow Ratio | g/g | 0.11 | 0.33 | 0.33 |
| First Reactor Feed Hydrogen/Ethylene Mass Flow Ratio | g/g | 2.3E−04 | 2.1E−04 | 3.3E−04 |
| First Reactor Temperature | °C. | 160 | 150 | 160 |
| First Reactor Pressure (gauge) | Pa | 725 | 725 | 580 |
| First Reactor Ethylene Conversion | % | 94.6 | 96.7 | 89.7 |
| First Reactor Catalyst Type | Type | Pro-catalyst 1 | Pro-catalyst 1 | Pro-catalyst 1 |
| First Reactor Co-Catalyst 1 Type | Type | Co-catalyst 1 | Co-catalyst 1 | Co-catalyst 1 |
| First Reactor Co-Catalyst 2 Type | Type | Co-catalyst 2 | Co-catalyst 2 | Co-catalyst 2 |
| First Reactor Co-Catalyst 1 to Catalyst Molar Ratio (B to Zr ratio) | Ratio | 1.1 | 1.3 | 1.2 |
| First Reactor Co-Catalyst 2 to Catalyst Molar Ratio (Al to Zr ratio) | Ratio | 20.5 | 25.7 | 39.2 |
| First Reactor Residence Time | min | 17.9 | 21.1 | 17.8 |
| Second Reactor Feed Solvent/Ethylene Mass Flow Ratio | g/g | 2.5 | 2.5 | 2.5 |
| Second Reactor Feed 1-octene/Ethylene Mass Flow Ratio | g/g | 0.044 | 0.103 | 0.134 |
| Second Reactor Feed Hydrogen/Ethylene Mass Flow Ratio | g/g | 4.7E−04 | 3.9E−04 | 6.3E−04 |
| Second Reactor Temperature | °C. | 195 | 195 | 195 |
| Second Reactor Pressure (gauge) | Pa | 725 | 740 | 580 |
| Second Reactor Ethylene Conversion | % | 91.9 | 91.7 | 91.6 |
| Second Reactor Catalyst Type | Type | Pro-catalyst 2 | Pro-catalyst 2 | Pro-catalyst 2 |
| Second Reactor Co-Catalyst 1 Type | Type | Co-catalyst 1 | Co-catalyst 1 | Co-catalyst 1 |
| Second Reactor Co-Catalyst 2 Type | Type | Co-catalyst 2 | Co-catalyst 2 | Co-catalyst 2 |
| Second Reactor Co-Catalyst 1 to Catalyst Molar Ratio (B to Zr ratio) | mol/mol | 7.6 | 6.9 | 5.5 |
| Second Reactor Co-Catalyst 2 to Catalyst Molar Ratio (Al to Zr ratio) | mol/mol | 1387.0 | 1210.1 | 2248.8 |
| Second Reactor Residence Time | min | 7.4 | 7.8 | 7.5 |

TABLE 2

Catalyst systems for Ex. 1-3

Pro-Catalyst 1

Pro-Catalyst 2

Co-catalyst 1  bis(hydrogenated tallow alkyl)methylammonium tetrakis(pentafluorophenyl)borate(1-)
Co-catalyst 2  Aluminoxanes, iso-Bu Me, branched, cyclic and linear; modified methyl aluminoxane

TABLE 3

Properties of the ethylene/octane copolymers

| Interpolymer | Unit | ASPUN™ 6000 | ASPUN™ 6850 | Ex. 1 | Ex. 2 | Ex. 3 |
|---|---|---|---|---|---|---|
| Density | g/cm$^3$ | 0.935 | 0.955 | 0.945 | 0.935 | 0.935 |
| I2 | g/10 min | 19 | 30 | 21 | 17 | 21 |
| I10/I2 | | 7.2 | 7.0 | 6.2 | 6.6 | 6.2 |
| ZSVR | | 1.4 | 1.0 | 1.2 | 1.3 | 1.2 |
| Tan δ at 1 rad/s | | 30.5 | 42.2 | 75.6 | 54.1 | 89.0 |
| Tan δ at 100 rad/s | | 2.9 | 4.6 | 3.5 | 3.0 | 3.7 |
| Ratio of Tan δ at 1 rad/s to Tan δ at 100 rad/s | | 10.4 | 9.2 | 21.5 | 18.2 | 24.1 |
| Vinyl unsaturation | per 10$^6$ total carbons | 235 | 353 | 127 | 131 | 143 |
| $M_{w(GPC)}/M_{n(GPC)}$ | | 2.7 | 3.1 | 2.4 | 2.3 | 2.3 |
| $M_{z(GPC)}/M_{w(GPC)}$ | | 2.3 | 3.2 | 2.0 | 2.0 | 1.9 |
| $M_{w(GPC)}$ | g/mol | 48737 | 45427 | 49080 | 51068 | 46766 |
| MWCDI | | −0.47 | 0.11 | 0.65 | 2.58 | 1.90 |
| CDC | | 47 | 42 | 52 | 45 | 54 |
| CDBI | % | 25 | 34 | 19 | 16 | 21 |
| Peak temperature of low temperature peak | ° C. | 74.0 | — | 88.1 | 68.6 | 73.4 |

TABLE 3-continued

Properties of the ethylene/octane copolymers

| Interpolymer | Unit | ASPUN™ 6000 | ASPUN™ 6850 | Ex. 1 | Ex. 2 | Ex. 3 |
|---|---|---|---|---|---|---|
| Weight fraction of low temperature peak | % | 39.2 | — | 43.1 | 36.1 | 38.3 |
| Peak temperature of high temperature peak | ° C. | 98.2 | 98.6 | 99.8 | 99.0 | 97.6 |
| Weight fraction of high temperature peak | % | 60.8 | 100 | 56.9 | 63.9 | 61.7 |
| Full width at half maximum of high temperature peak | ° C. | 7.8 | 6.2 | 3.6 | 3.6 | 4.2 |

Example 4—Monocomponent Fiber Non-Wovens Made on Reicofil 4 Spunbond Line

Non-woven spunbond from monocomponent fibers comprising ethylene/alpha-olefin copolymers are spun on a single beam Reicofil 4 spunbond line. Spunbond cabin air pressure is used to attenuate the fibers to a maximum level. The maximum level is chosen as the highest cabin air pressure that the fiber curtain could sustain with good spinning stability. Stability is described as the highest cabin air pressure where no repeated fiber breaks occur as determined by visual inspection. An increase in cabin air pressure beyond the maximum cabin air pressure would result in repeated fiber breaks. (Fabric samples are collected at the nominal 2 denier, 2000-3000 Pa standard cabin air pressure conditions, as well as at the maximum sustainable cabin air pressure or 4400 Pa, whichever is lower.) Cabin air temperature is 22° C. The fibers are drawn to a nominal fiber denier of approximately 2 denier using a cabin pressure system that starts with an initial cabin air pressure of 2000 Pa, and then is incrementally increased to the maximum cabin air pressure while maintaining stable fiber spinning.

Throughput is kept constant at 0.56 ghm (gram per hole per minute). The machine (Reicofil 4 spunbond line) is equipped with a spinneret having 7022 holes. The die has a hole density of 6861 holes/meter with each hole having a diameter of 0.6 mm. The hole has a L/D ratio of 4. Extruder temperatures are set at 230° C. and the die temperatures are set at 230° C. with a polymer melt temperature of approximately 230° C. All samples are produced at 20 GSM (grams per square meter) fabric. Bonding of the web takes place between an engraved roll and a smooth roll with a nip pressure of 70 daN/cm while maintaining the oil temperature of the smooth roll 2° C. below the oil temperature of the engraved roll.

As shown in Table 4a, Ex. 2 and Ex. 3 based fibers can endure maximum cabin pressures without break of 3300 and 4400 Pa respectively as compared to 2300 Pa for the comparative sample made with ASPUN™ 6000. Filament speeds of Ex. 2 and Ex. 3 samples are over 2600 meter per minute (mpm), indicative of better spinning compared to the comparative example. In addition to testing maximum cabin pressure, the samples are subject to tensile testing in machine direction (MD) peak load and cross direction (CD) peak load, and measurement of fiber diameter, denier, and fuzz as described above. The results are shown in Table 4b.

TABLE 4a

Spinnability on Reicofil 4 spunbond line

| Interpolymer | Highest Cabin pressure without fiber break (Pa) | Filament speed (meter per minute) | Denier (g/9000 m) | Total throughput rate (kg/h) | Throughput per hole (g/hole/min) | Engraved roll temperature (° C.) |
|---|---|---|---|---|---|---|
| ASPUN™ 6000 | 2300 | 2526 | 2.0 | 238 | 0.54 | 124 |
| Ex. 2 | 3300 | 2653 | 1.9 | 237 | 0.53 | 127 |
| Ex. 3 | 4400 | 3877 | 1.3 | 237 | 0.53 | 127 |

TABLE 4b

Mechanical properties of monocomponent nonwovens made on Reicofil 4 spunbond line

| Interpolymer | Cabin Pressure (Pa) | Engraved roll temperature (° C.) | MD tensile strength (N) | CD tensile strength (N) | Fiber Diameter (micron) | Denier (g/9000 m) | Fuzz level (mg/cm$^2$) |
|---|---|---|---|---|---|---|---|
| ASPUN™ 6000 | 2300 | 120 | 9.1 | 4.1 | 16.9 | 1.9 | 0.45 |
| ASPUN™ 6000 | 2300 | 122 | 8.7 | 4.1 | 17.5 | 2.0 | 0.32 |

TABLE 4b-continued

Mechanical properties of monocomponent nonwovens made on Reicofil 4 spunbond line

| Interpolymer | Cabin Pressure (Pa) | Engraved roll temperature (° C.) | MD tensile strength (N) | CD tensile strength (N) | Fiber Diameter (micron) | Denier (g/9000 m) | Fuzz level (mg/cm$^2$) |
|---|---|---|---|---|---|---|---|
| ASPUN™ 6000 | 2300 | 124 | 8.5 | 4.1 | 17.9 | 2.1 | 0.24 |
| Ex. 2 | 2800 | 120 | 4.6 | 2.9 | 17.3 | 2.0 | 0.16 |
| Ex. 3 | 2800 | 120 | 5.7 | 3.0 | 18.5 | 2.3 | 0.19 |

Example 5 Spinnability of Interpolymer Compositions on Hills Fiber Spinning Line Fibers are spun on a Hills Bicomponent Continuous Filament Fiber Spinning Line at a throughput rate of 0.6 ghm. A Hills Bicomponent die is used to operate at a 50/50 core/sheath ratio with same material fed into each extruder thereby forming monocomponent fibers. The die configuration consists of 144 holes, with a hole diameter of 0.6 mm. The hole has a L/D of 4/1. Quench air temperature and flow rate are set at 15-18° C. and 520 cfm (cubic feet per minute), respectively. Extruder profiles are adjusted to achieve a melt temperature of 240° C. A yarn of 144 filaments is drawn using an air aspirator. The fibers are drawn using a slot pressure that starts with an initial value of 10 psi, and then is incrementally increased to the maximum slot pressure while maintaining stable fiber spinning.

Polymer compositions Ex. 2 and Ex. 3 exhibit better spinnability allowing higher slot pressure without fiber breaks than does ASPUN™ 6000 as shown in Table 5.

TABLE 5

Spinnability of interpolymer compositions on Hills fiber spinning line

| Interpolymer | Melt temperature (° C.) | Denier (g/9000 m) | Filament speed (m/min) | Throughput per hole (g/hole/min) | Slot pressure (psi) | observation |
|---|---|---|---|---|---|---|
| ASPUN™ 6000 | 240 | 5.15 | 1049 | 0.6 | 15 | Fiber breaks above 15 psi |
| Ex. 3 | 240 | 1.54 | 3506 | 0.6 | 40 | No fiber breaks, equipment limitation to go over 40 psi |
| Ex. 2 | 240 | 1.49 | 3624 | 0.6 | 40 | No fiber breaks, equipment limitation to go over 40 psi |

Example 6—Bicomponent Fiber Non-Wovens with Ziegler-Natta Polypropylene in the Core Non-wovens spunbond from bicomponent fibers are produced on a single beam Reicofil 4 spunbond line in a 50:50 (in weight percent) Core:Sheath bicomponent configuration. The core of the bicomponent fiber is Ziegler-Natta homopolymer polypropylene available from Braskem under the name Polypropylene CP360H. The sheath is an ethylene/alpha olefin interpolymer composition. The machine (Reicofil 4 spunbond line) is equipped with a spinneret having 7022 holes (6861 holes/m) and an exit diameter of each hole of 0.6 mm. The hole has a L/D ratio of 4. Extruder temperatures are set at 250° C. and the die temperatures are set at 255° C. with a polymer melt temperature of approximately 250° C. Fibers are collected at the maximum sustainable cabin air pressure while maintaining stable fiber spinning and transformed into a nonwoven of target basis weight 20 GSM. Bonding of the web takes place between an engraved roll and a smooth roll with a nip pressure of 70 daN/cm while maintaining the oil temperature of the smooth roll 2° C. below the oil temperature of the engraved roll. Processing conditions and properties of the non-woven are shown in Table 6. The inventive non-woven shows comparable or better properties even though it is a lower density material.

TABLE 6

Mechanical properties of bicomponent nonwoven made on Reicofil 4

| Sheath resin | Unit | Aspun™ 6850 | Ex. 1 |
|---|---|---|---|
| Density | g/cm$^3$ | 0.955 | 0.945 |
| Highest Cabin pressure without fiber break | Pa | 6000 | 6000 |
| Filament speed | Meter per minute | 4200 | 3877 |
| Total throughput | kg/h | 238 | 238 |
| Throughput per hole | g/hole/min | 0.56 | 0.56 |
| Extruder temperature | ° C. | 250 | 250 |
| Cabin air temperature | ° C. | 20.0 | 20.1 |
| Nip pressure | daN/cm | 70 | 70 |
| Engraved roll temperature | ° C. | 147 | 149 |
| MD tensile strength | N | 33.5 | 36.9 |
| CD tensile strength | N | 13.8 | 13.1 |
| Fiber Diameter | μm | 13.8 | 14.3 |
| Denier | g/9000 m | 1.2 | 1.3 |
| Fuzz | mg/cm$^2$ | 0.10 | 0.10 |

Example 7 Bicomponent Fiber Non-Wovens with Metallocene-Polypropylene in the Core Non-wovens spunbond from bicomponent fibers are produced on a single beam Reicofil 4 spunbond line in a 50:50 (in weight percent) Core:Sheath Bicomponent configuration. The core of the bicomponent fiber is metallocene homopolymer polypropylene available from ExxonMobil under the name Polypropylene 3854. The machine (Reicofil 4 spunbond line) is equipped with a spinneret having 7022 holes (6861 holes/m) and an exit diameter of each hole of 0.6 mm. The hole has a L/D ratio of 4. Extruder temperatures are set at 252° C. and the die temperatures are set at 250° C. with a polymer melt temperature of approximately 250° C. Fibers are collected at the maximum sustainable cabin air pressure while maintaining stable fiber spinning and transformed into a nonwoven of target basis weight 20 GSM. Bonding of the web takes place between an engraved roll and a smooth roll with a nip pressure of 70 daN/cm while maintaining the oil temperature of the smooth roll 2° C. below the oil temperature of the engraved roll. Processing conditions and properties of the non-woven tested as described above are shown in Table 7.

TABLE 7

Mechanical properties of bicomponent nonwoven made on Reicofil 4

| Sheath resin | Unit | Aspun ™ 6850 | Ex. 1 | Ex. 1 | Ex. 1 |
|---|---|---|---|---|---|
| Cabin pressure | Pa | 8200 (highest without fiber break) | 6000 | 8400 | 9600 (highest without fiber break) |
| Filament speed | mpm | 3600 | 3877 | 3877 | 3877 |
| Total throughput | kg/h | 238 | 238 | 238 | 238 |
| Throughput per hole | g/hole/min | 0.56 | 0.56 | 0.56 | 0.56 |
| Extruder temperature | ° C. | 252 | 252 | 252 | 252 |
| Cabin air temperature | ° C. | 21.4 | 21.3 | 21.9 | 22.4 |
| Nip pressure | daN/cm | 60 | 70 | 70 | 70 |
| Engraved roll temperature | ° C. | 149 | 148 | 147 | 148 |
| MD tensile strength | N | 34.9 | 34.9 | 38.4 | 34.8 |
| CD tensile strength | N | 14.8 | 18.1 | 19.6 | 17.5 |
| Fiber Diameter | μm | 14.5 | 13.6 | 14.2 | 13.5 |
| Denier | g/9000 m | 1.4 | 1.3 | 1.3 | 1.3 |
| Fuzz | mg/cm$^2$ | 0.11 | 0.10 | 0.09 | 0.07 |

Example 8—Bicomponent Staple Fibers

Core sheath fibers are made with a polyethelene terephthalate (PET) core. The PET used is RT5140 from Invista (homopolymer, luster: micro-dull, IV: 0.65). The fibers are extruded at a Hills Inc. pilot staple fiber line. A spinpack with 36 holes of 0.25 mm round shape bicomponent core/sheath design is used, together with a 3-roll drawing station and a Leesona winder. Two extruders are used to separately feed the PET and the ethylene/alpha-olefin interpolymer. Both extruders are single screw with 19 mm (¾") and L/D of 30:1, fitted with 3 heating zones. In order to show the superior spinnability of the inventive samples, the following procedure is used: 1) fibers are extruded at a throughput of 0.6 ghm (grams per hole per minute), targeting 2.1 filament denier; 2) the throughput is reduced in steps of 0.05 ghm, while stabilizing the process for 5 minutes in between throughput changes. No changes in other process parameters, such as stretch ratio or temperatures, are allowed. The throughput is reduced until breaks are observed in the process. In such case, throughput is increased to the immediately previous conditions and a yarn of 36 filaments is taken. Tensile test is performed on the multifilament yarn and mechanical properties are obtained. Table 8 illustrates the fabrication conditions, lowest denier of the filaments obtainable, and the mechanical properties of the fibers.

The results in Table 8 show superior spinnability of the Ex. 1. It is able to be extruded at lower deniers without breaks. In fact, Ex. 1 reaches the limitation of the machine, i.e. maximum line speed and minimum throughput per hole, with the spinpack used.

TABLE 8

Fabrication conditions and mechanical properties of fibers.

| Sheath resin | ASPUN ™ 6850 | Ex. 1 |
|---|---|---|
| Lowest Throughput without breaks, ghm | 0.5 | 0.25 |
| Spinpump speed A, rpm | 26.8 | 13.4 |
| Spinpump speed C, rpm | 19.5 | 9.7 |
| Sheath/Core ratio | 50/50 | 50/50 |
| Extrusion Temperature Z1, ° C. | 280 | 280 |
| Extrusion Temperature Z2, ° C. | 285 | 285 |
| Extrusion Temperature Z3, ° C. | 290 | 290 |
| Spinpump A/C Temperature, ° C. | 290 | 290 |
| Conduct A/C Temperature, ° C. | 290 | 290 |
| Spinhead Temperature, ° C. | 278.2 | 278.1 |
| Denier Roll Temperature, ° C. | 80 | 80 |
| Denier Roll Speed, mpm | 750 | 750 |
| Stretching Roll Temperature, ° C. | 80 | 80 |
| Stretching Roll Speed, mpm | 2445 | 2445 |
| Relax Roll Temperature, ° C. | 30 | 30 |
| Relax Roll Speed, mpm | 2455 | 2455 |
| Denier of multifilament yarn (g/9000 m) | 63.0 | 32.4 |
| Denier per filament (g/9000 m) | 1.75 | 0.90 |
| Tenacity, cN/denier | 2.29 | 2.24 |
| Elongation at break, % | 33 | 36 |

What is claimed is:

1. A nonwoven fabric comprising at least one fiber having a first component prepared from at least 75 wt. % of an ethylene/alpha-olefin interpolymer composition, wherein the ethylene/alpha-olefin interpolymer composition has:
- a density in the range of 0.930 to 0.965 g/cm3,
- a melt index (I2) in the range of from 10 to 60 g/10 minutes, wherein the I2 is measured according to ASTM D1238, 190° C., 2.16 kg,
- a molecular weight distribution, expressed as the ratio of the weight average molecular weight to number average molecular weight (MW(GPC)/Mn(GPC)) as determined by GPC in the range of from 1.5 to 2.6,
- a tan delta at 1 radian/second of at least 45, wherein the tan delta is determined at 190° C. over a frequency range from 0.1 to 100 radian/second at five points per decade interval and strain amplitude is constant at 10%,
- a low temperature peak and a high temperature peak on an improved comonomer composition distribution (ICCD) elution profile by Crystallization Elution Fractionation, having two distinguishable peaks between 35° C. to 110° C., and
- a full width at half maximum of the high temperature peak is less than 6.0° C.

2. The nonwoven fabric of claim 1, wherein the ethylene/alpha-olefin interpolymer composition has an I10/I2 of less than 6.9, wherein the I10 is measured according to ASTM D1238, 190C, 10.0 kg.

3. The nonwoven fabric of claim 1, wherein ethylene/alpha-olefin interpolymer composition has an MW(GPC)/Mn(GPC) >(I10/I2)−4.63.

4. The nonwoven fabric of claim 1, wherein the ethylene/alpha-olefin interpolymer composition has a ratio of tan delta at 1 radian/second and 190° C. to tan delta at 100 radians/second and 190° C. of at least 12.

5. The nonwoven fabric of claim 1, wherein the ethylene/alpha-olefin interpolymer composition has a vinyl unsaturation per 1,000,000 carbons of less than 230.

6. The nonwoven fabric of claim 1, wherein the ethylene/alpha-olefin interpolymer composition has:
- a peak temperature of the low temperature peak of 50 to 90° C.;
- a weight fraction of the low temperature peak of 25 to 65 wt. %;
- a peak temperature of the high temperature peak of greater than 90° C.; and
- a weight fraction of the high temperature peak of 35 to 75 wt. %.

7. The nonwoven fabric of claim 1, wherein the ethylene/alpha-olefin interpolymer composition has a composition distribution breadth index (CDBI) of less than 0.5.

8. The nonwoven fabric of claim 1, wherein the ethylene/alpha-olefin interpolymer composition has a comonomer distribution constant (CDC) of less than 100.

9. The non-woven fabric of claim 1, wherein the composition has a molecular weighted comonomer distribution index (MWCDI) of greater than 0.25.

10. The non-woven fabric of claim 1 wherein the at least one fiber is a mono component fiber.

11. The non-woven fabric of claim 10 further characterized by at least one of the following: the ethylene/alpha-olefin interpolymer has a peak temperature of the low temperature peak of 60 to 75° C. or the density of the ethylene/alpha-olefin interpolymer is 0.930 to 0.940 g/cm3.

12. The non-woven fabric of claim 1 wherein the at least one fiber is a bicomponent fiber having a fiber cross-sectional structure formed from a first region of the first component and a second region of a different polymer.

13. The non-woven fabric of claim 12 wherein the different polymer is a polypropylene, a polypropylene copolymer or a polyester.

14. The non-woven fabric of claim 12 wherein the cross-sectional structure is a core/sheath structure.

15. The non-woven fabric of claim 14 wherein the core is formed from the different polymer.

16. The non-woven fabric of claim 12 characterized by at least one of the following: the density of the ethylene/alpha olefin interpolymer composition is in the range of 0.940 to 0.960 g/cm3 or the ethylene/alpha-olefin interpolymer composition has a peak temperature of the low temperature peak of 75 to 90° C.

* * * * *